Figure 1:
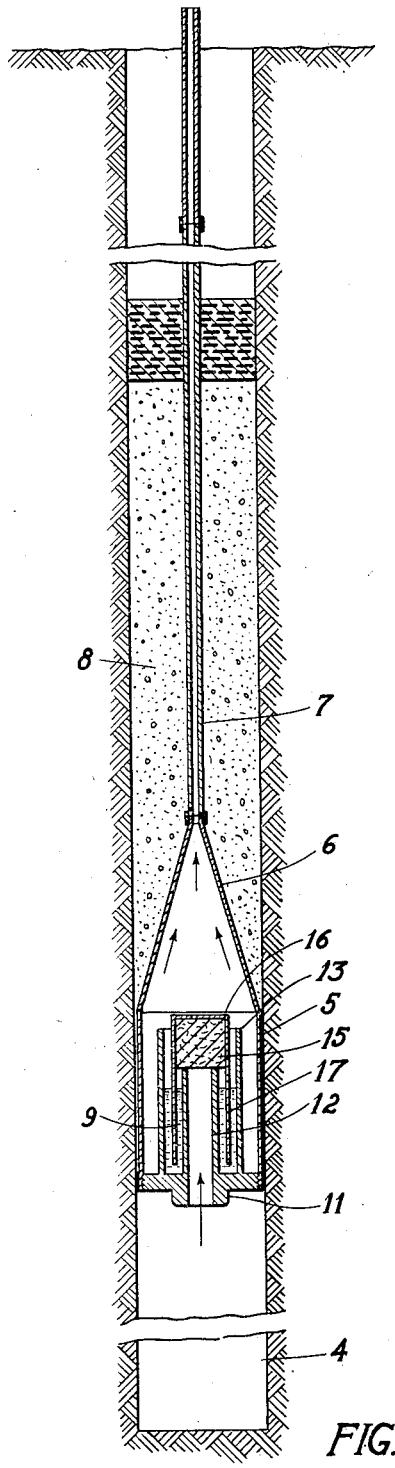

March 29, 1949.  A. J. ABRAMS  2,465,564
LOCATION OF BURIED HYDROCARBON DEPOSITS
Filed Nov. 4, 1943  2 Sheets-Sheet 1

Armand J. Abrams
INVENTOR

BY Sidney A. Johnson
ATTORNEY

March 29, 1949.   A. J. ABRAMS   2,465,564
LOCATION OF BURIED HYDROCARBON DEPOSITS
Filed Nov. 4, 1943   2 Sheets-Sheet 2

Armand J. Abrams
INVENTOR
BY Sidney A. Johnson
ATTORNEY

Patented Mar. 29, 1949

2,465,564

UNITED STATES PATENT OFFICE 2,465,564

LOCATION OF BURIED HYDROCARBON DEPOSITS

Armand J. Abrams, Dallas, Tex., assignor, by mesne assignments, to Socony-Vacuum Oil Company, Incorporated, New York, N. Y., a corporation of New York Application November 4, 1943, Serial No. 508,917

2 Claims. (Cl. 23—230)

This invention relates to methods of prospecting for oil, gas, or similar buried deposits which give rise to gaseous emanations of a nature which may be identified and related to the source. It is particularly directed to prospecting for buried hydrocarbon deposits, such as natural gas or petroleum oil, the hydrocarbon gas emanations from which may be related to the position of the underground deposit.

It has been recognized that anomalous variations in the amount of gaseous materials, related to hydrocarbons, such as hydrogen, hydrocarbons, and oxides of carbon, occur in the vicinity of petroliferous deposits and that such anomalies may be correlated with known petroliferous deposits or that they may be used alone, or in correlation with other geological or geophysical methods, for the locating of prospective petroliferous deposits.

However, such methods as are already being used in commercial exploration and which have to do with the sampling of soil and the removal of gas from that soil sample or which rely on the analysis of gas samples collected and removed from the soil-in-place under high vacuum conditions have several drawbacks.

In connection with the first method referred to, the analytical data cannot be readily interpreted in terms of the soil-air hydrocarbons which they should represent for two closely related reasons: (1) difference in soil sorptive abilities; (2) difference in conditions of sorption. With methods known at present, neither of these can be properly measured, evaluated or corrected for. The problem of correction for these factors is a complicated one.

The other and earlier known method of soil gas analysis offers more promise but also suffers from a lack of properly developed technique; sampling gas in a borehole under high vacuum creates unnecessary complications.

Experimental work leads me to believe that the two methods just discussed have at least one serious drawback in common; namely, that of sampling at too shallow depths. It has been found that sampling at shallow depths will give appreciably different gas compositions from those obtained by sampling below the limits of atmospheric induced breathing effects.

It is an object of this invention to provide a novel method for geophysical prospecting by observation of gaseous emanations from soil in the area being prospected.

A further object is the observation of anomalies in rate of emanation of gaseous material from soil over an area to be prospected and the relation of those anomalies to the possible presence of petroliferous deposits below that surface area.

A further object is the observation of anomalies in rates of emanation of various constituents of gaseous emanations over an area to be prospected and the relation of those anomalies to the possible presence of petroliferous deposits below the area examined.

A further object is the provision of a low cost method of obtaining additional information correlated with, and supplementary to other methods of geophysical prospecting.

This invention is based upon the discovery that anomalous variations in the rates of flow of gases from the soil occur in various portions of an area under examination, and that these variations may be related to the presence of buried petroliferous deposits.

This invention is based particularly upon the surprising discovery that sufficiently large rates of flow are observed, and sufficiently large variations are found therein to greatly increase the ease of interpretation of the data. The rate of flow method based upon this discovery does away with the uncertainties inherent in methods which involve taking from relatively very shallow depths within the "breathing zone," small samples of gas or small samples of soil from which gas is extracted, and submitting these gas samples to analysis.

For example, in one case, at a point where a soil sample analysis showed only 1 to 2 parts of ethane per billion, examination of a test hole drilled to a depth of ninety feet showed a rate of evolution of gases of 3 cubic feet of gas per hour although the rates more generally observed are considerably below this value. The gas contained about 85 percent hydrocarbons. From this, it is obvious that in many cases the method herein disclosed is less open to errors of technique and in many instances may be of vastly increased sensitivity.

In its barest essentials the method consists in sinking a bore hole into the earth to a depth below which "breathing" of the soil due to temperature and other variations is a significant factor. The bore hole is generally bottomed within the zone of water saturation (below the water table), but not necessarily, especially where the water saturation zone is located at a very considerable depth below the surface and/or the water bearing strata have a high water content. The rate of evolution of gas per unit area of exposed hole wall surface from the surrounding soil into the bottom of the hole after suitable sealing means have been provided to isolate the bottom of the hole from communication with the atmosphere is then measured.

It is of importance in this method that the hole be bottomed below the level at which movement of air and gases within the soil initiated by surface temperature and pressure changes would vitiate the results. Such movement of the air and gases is herein denoted "breathing." Ordinarily this method could quite conveniently be carried out in "shot holes" drilled for use with seismograph surveys, before the shots are placed and fired.

Many methods of measuring the amount of gas evolved during a given period of time may be made use of. In some areas, flows would be sufficient so that known metering devices, or means for determining gas volume by means of pressure differentials may be used. In others, probably in most cases, more delicate methods may be required. For example, the gases may be caused to pass through and be absorbed in a suitable absorptive liquid, placed either at the bottom of the hole or in communication therewith and the gas amount measured or estimated either by changes in the properties of the absorptive liquid, as for example by the changes in refractive index, or by desorption of the gas therefrom and subsequent volumetric measuring and analysis. As a further example, particularly when records of gas evolution over a period of time are desirable, use may be made of the familiar hot-wire gas flowmeter, wherein a hot-wire, heated by a constant energy input, exposed to the flowing gas, records by its change in temperature and/or resistance, after suitable calibration, the amount of gas flowing past it. The latter method is particularly applicable to a survey wherein simultaneous observation of a number of points is desired.

Figure 2:
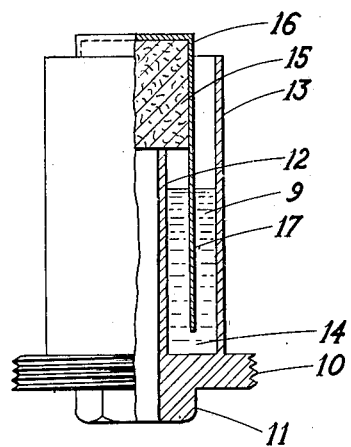
Figure 3:
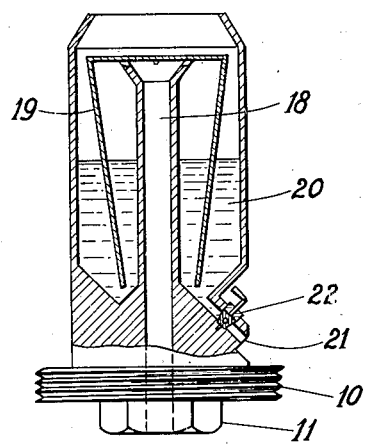

As an example of one method by which the rate of evolution of gas may be measured, reference is made to the drawing made a part of this specification, Figure 1 of which shows a simplified vertical cross section of a bore hole under test and Figures 2 and 3 of which show detailed sections of a particular portion of the apparatus. The drawing also shows in Figures 4 and 5, wherein the rate of flow obtained in various test holes in cc. per minute is plotted against the exposed surface area of the test section in square inches, the effect of variation in surface area of the collecting chamber on the total evolution of soil gas into the collecting chamber.

In Figure 1, 4 denotes the chamber at the bottom of the bore hole, into which there has been suspended a sampler 5, the cylindrical body of which is tapered to 6, to connect with a smaller pipe 7, which extends to the surface. Surface water, etc., are excluded by packing 8. Within sampler 5 there is mounted a trap 9, shown in more detail in Figure 2. This consists of a threaded base 10 with nut 11, from which there extends upwardly two cylinders 12 and 13, as shown, forming an annular well 14, which may be filled with a sealing liquid, preferably non-absorptive to soil gases, such as water or mercury. Resting upon cylinder 12, we find a porous absorptive material block 15, such as filtros, housed in container 16, which has a depending skirt 17, which dips into the sealing liquid in space 14. The porous absorptive material block is saturated with a liquid sorption material, such as ethyl alcohol, kerosene, a light oil fraction, pyrogallol, caustic soda, ammoniacal cuprous chloride, or the like, capable of dissolving the soil gas, or an indicative portion thereof. After remaining within the bore-hole for a specified time, the apparatus may be removed, the material removed from the porous block, and examined to determine the amount of gas constituents absorbed.

In Figure 3, a liquid sorption system of different type is used, wherein soil gas passing up through central passage 18 will be forced by baffle 19 to pass through sorptive liquid 20, of the type described above. In order to permit ready removal of the sorptive liquid from the sampler, a hole 21 is drilled through the side of the base in communication with the bottom of the annular liquid well. This hole 21 is provided with a suitable valve 22, which is normally closed, but may be opened to drain off the sorptive liquid or a sample thereof.

In operation, a selected number of bore-holes are drilled at suitably distributed points over the area to be surveyed. The samplers are then placed in each hole a definite distance from the bottom thereof, and this distance recorded, so that the exposed area of the chamber 4 may be known. The sampler is then sealed into the bore-hole by a suitable packing, and left for the time period over which it is desired to measure the continuous or average rate of flow. The rates of flow observed in each of the selected holes over the area may then be compared for anomalies indicative of hydrocarbon deposits. Since the rate of flow into the collecting chambers will be a function of the amount of exposed soil surface area, the diameter and depth of the collecting chamber should be recorded. I have found that the results are most readily comparable where the collecting chambers have a uniform surface area. Inasmuch as the bore-holes will most conveniently have the same diameter, since they would presumably all be drilled by the same drilling rig, all that would be necessary would be to place the sampler a uniform distance from the bottom of each hole.

Figure 4:
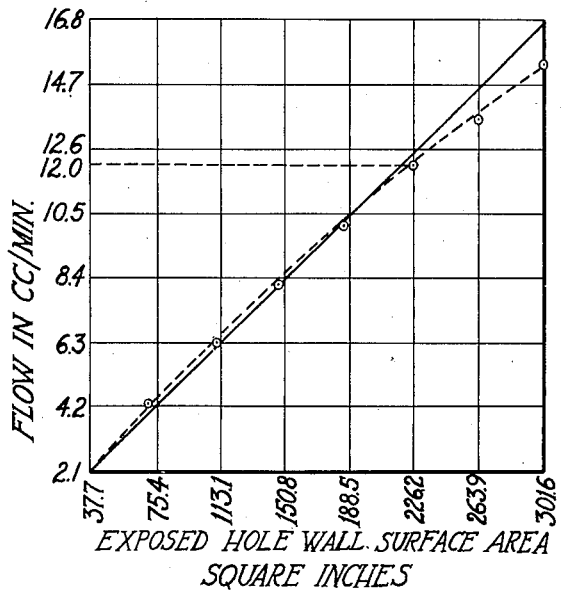
Figure 5:
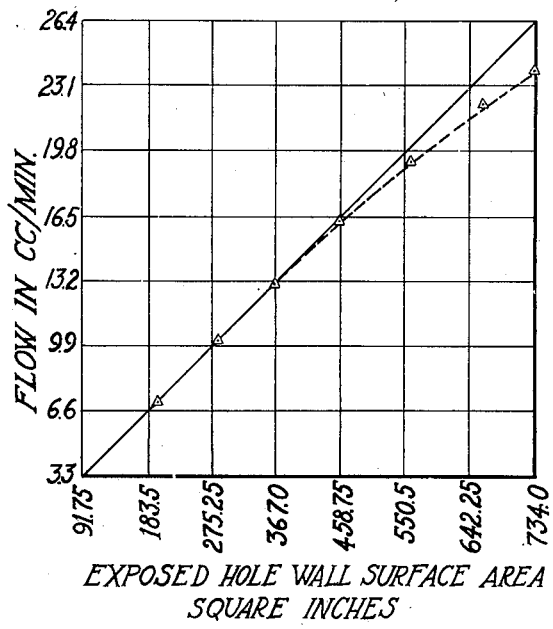

In some cases it is not possible or convenient to make the collecting chambers all of the same surface area, as for example where there are differences in the types of formations penetrated by the various bore-holes. Thus since it is desirable to collect all samples from the same type of formation in order to have uniform surface conditions of the collecting chambers, it may be impossible to have uniform depth of collecting chambers where the depth of the formation being sampled varies widely. Also in certain holes it may prove necessary to plug back from the bottom of the hole to cut off a high rate of water seepage caused by penetration of a stratum having a high water content. Where the collecting chambers are not of the same size, this factor must be taken into account in evaluating the total flow into the collecting chamber. Within certain limits of size variation the total flow will vary approximately in direct proportion to the exposed surface area, and a comparison of the rates of flow obtained in the various bore-holes per unit of exposed hole wall surface area will be accurate. As shown by the graphs in Figures 4 and 5, wherein the results obtained by varying the size of the sample collecting chambers in bore-holes at depths of 40 and 60 feet respectively in a clay formation in the Gulf Coast area of Texas, the flow per unit area will be sufficiently accurate so long as the variations do not exceed 300 to 400 percent. The results recorded in Figures 4 and 5 are but representative, and for accuracy wherever large variations in collecting chamber wall areas are unavoidable, a similar curve should be made by varying the size of the collecting chamber in a hole drilled to an average depth, and showing a rate of flow close to the average of that observed in the area being surveyed, to obtain data suitable for use as a correction factor to be applied to the flow rates per unit area observed in the various holes. For example if, in making a survey of the area from which the results obtained in Figure 4 were obtained, it was necessary to use a collecting chamber having but one-sixth the exposed area of that utilized for the other chambers, the flow rate per unit area should be multiplied by the factor $$\frac{12.0}{12.6}$$

in order that the flow rates would be comparable in view of the wide difference in exposed area. This is apparent from a study of Figure 4 since at the sampling station where the size of the collecting chamber was varied, the flow rate did not increase directly proportional with the increase in surface area. For a chamber having a surface area of 226.2 sq. in. a flow of 12.0 cc./min. was observed, whereas with a chamber of 37.7 sq. in. surface area a flow rate of 2.1 cc./min. was obtained. Thus, the test station showed that a six fold $$\left(\frac{226.2}{37.7}\right)$$

increase in surface area gave a flow increase of only $$\frac{12.0}{2.1} \text{ or } 5.714+ \left( \text{or } \frac{12.0}{12.6} \times 6 \right)$$

fold. Hence in this particular area it was found that the smaller collecting chambers gave proportionately greater flow rates per unit area and the correction factor to be applied to the flow rate observed in the smaller chamber should be one to reduce the observed reading by the factor stated.

While several factors may be involved in causing the rate of flow to vary non-uniformly where wide variations in area of collecting chamber are encountered, one explanation may lie in the fact that with wide variations, a considerable variation in the ratio of exposed side wall area to exposed collecting chamber bottom area is encountered. Since the permeability of the formation from which the sample is taken may have a directional character, and since the passage of gases through the formation is likewise generally directional, the position of the exposed surface in the formation as well as its area will determine the amount of flow through it. Another factor involved appears to be the shape of the collecting chamber, i. e., the further it departs from a sphere, the less the rate of flow per unit area becomes, hence cylindrical chambers whose depths are equal to their diameters probably represent the most practical shape from the standpoint of maximum rate of flow per unit area. However, preferential rates of flow through surfaces in the direction of the sample collecting zone that is elongated may frequently more than counterbalance this effect. Other factors are apparently involved. Since the amount of variation in flow rate per unit area will vary with the depth of the collecting chamber below the earth's surface, the nature of the formation around the collecting chamber, the nature of the formations thereabove, the direction of preferential flow, etc., where chamber surface area variations of considerable magnitude are necessary, an empirical determination approximating average conditions should be made.

The preferred method of operation is to utilize a uniform area of hole-wall surface from which evolution occurs, by having all bore-holes of a common diameter and using a uniform depth of collecting chamber. By so operating, it is possible to drop the amount of hole-wall area exposed from consideration in determinating and correlating anomalies in the flow rate.

In the foregoing, it is pointed out that what is herein considered of prime importance is the rate of evolution of gas per unit of exposed surface area into the collecting zone within the bore-hole. It is, of course, to be understood that such standardization of conditions as are applicable, for example, corrections for bottom-hole pressure variations between several holes in a series of tests, corrections for atmospheric pressure between tests upon a series of days, and other comparative standardization will be applied.

It will, of course, be necessary in many cases to so manage operations at the bottom of the hole, in holes where water flows in from the formation being examined, as to prevent submergence of the gas analyzer by incoming water, and to effectively separate gas from fluid at this point. In the drawing, Figure 1, I have illustrated the sealing off of the sampler from access thereto of gases and liquids from above by the use of a packing of a suitable material such as kieselguhr. While this practice is often sufficient, where the bore-hole penetrates a formation containing considerable quantities of water, the water may flow through the earth around the packing material and enter the collecting zone from the sides below the packing. In such instances recourse may be had to the use of casing. The hole may be cased completely and then the collecting chamber formed by coring below the casing. The application of the necessary steps to prevent the submergence of the sampler will be apparent to those skilled in the art, and the methods used will vary with the different situations encountered.

It will also be understood that anomalies in the rate of flow of the individual, constituent gases entering the bore-hole, as well as in total rate, are of use in this method. For example, in areas without marked anomalies in total rate of evolution from point to point, anomalies in the rate of evolution of individual constituents of the gaseous mixture may occur and are of indicative value. The rate of flow of individual constituents may, for example, be readily determined by analysis of the mixture. Another suitable method would be to use a selective adsorbent or absorbent agent and merely measure the rate of evolution of the single constituent. The sorption liquids mentioned above as suitable for use for impregnation of the porous block or as the sorption liquid, 20, in Figure 3, for example are selective: pyrogallol for oxygen; caustic soda for carbon dioxide; (The quantity of this gas in soil gases when considered in relation to the quantity of oxygen therein having been found of value as indicative of the location of petroliferous deposits as described and claimed in the copending application of Nelson P. Stevens, Serial Number 569,560, filed December 23, 1944.) ammoniacal cuprous chloride for carbon monoxide; ethyl alcohol, kerosene, and light absorption oil for hydrocarbons. By passing the soil gas through these liquids singly or in succession, the rates of flow of one or more individual constituents could be determined.

The term "soil" as used herein denotes not merely the surface portion of the earth in the area to be prospected, but is utilized in the broad sense to denote the whole of the vertical column which may be explored by this method of prospecting. In this sense, it will be seen not to include merely the surface layer of material suitable for cultivation, but also the subsoil, and even to extend into the relatively undecomposed underlying strata. The term soil-gas herein used in an equally broad sense as covering that gas present in, or evolved from, or capable of being evolved from the earth at any level within the scope of the method herein disclosed.

I have referred to the collection of the soil gas as frequently being done within the zone of water saturation. By this I refer to the location of the collecting zone in strata which lie beneath the "water table" and which are saturated with water. This does not necessarily mean that the strata contain any large amount of water, and in fact the sampling is preferably done in strata which are capable of adsorbing but a few percent of water to minimize or avoid difficulties with water flow into the collecting zone. By sampling within the zone of water saturation, seasonal variations in the water content of the soil strata are obviated, and since the sorbed water content remains constant the sorptive characteristics of the soil in the strata being sampled are constant.

The foregoing description of my invention is to be considered as illustrative rather than restrictive, and many modifications in materials suggested, sampling techniques and apparatus will be readily apparent to those skilled in the art. My invention should therefore not be limited except as indicated in the appended claims.

This application is a continuation-in-part of my copending application Serial No. 340,245, filed June 13, 1940, and entitled "Geophysical prospecting methods."

I claim:

1. The method of prospecting for hydrocarbons which comprises sinking bore-holes at points distributed over the area to be prospected to depths below the limit of atmospheric "breathing" and within the zone of water saturation, selecting a zone in each bore-hole located below the limit of atmospheric "breathing" and within the zone of water saturation, determining the amount of hole-wall surface from which soil gas evolution may occur into said zone, isolating said zone from access thereto of gases from other levels in the bore-hole, contacting the soil gases evolved from the exposed hole-wall surface at their natural rate into said zone with a plurality of selective sorption materials for different indicative constituents of the soil gas in succession whereby the rate of evolution of a plurality of individual indicative gaseous constituents of the soil gases may be determined, and correlating variations in the rate of evolution of the plurality of constituents as determined per unit area of hole-wall surface in the individual holes throughout the area examined whereby information useful in locating petroliferous deposits may be obtained.

2. In the prospecting for petroliferous deposits the method which comprises sinking boreholes at spaced points in the surface of the earth over an area to be prospected to depths below the limit of atmospheric "breathing", sealing off a section of each borehole at a depth below the limit of atmospheric "breathing" from contamination from above while maintaining provision for passage of gas through the seal, whereby gas emanating from the strata surrounding the said sections may flow thereinto at a rate equal to that of its natural emanation from the surrounding strata without acceleration or retardation, disposing an absorbent material capable of absorbing at least one indicative constituent of the emanating gas in contact with the gas flowing through said sealed off section, determining the rates at which gas is absorbed by the absorbent material in each of said sections per unit area of strata exposed in said sections, and correlating variations in said rates among the various holes whereby information useful in locating petroliferous deposits may be obtained.

ARMAND J. ABRAMS.

REFERENCES CITED

The following references are of record in the file of this patent:

UNITED STATES PATENTS

| Number | Name | Date |
|---|---|---|
| 2,192,525 | Rosaire et al. | Mar. 5, 1940 |
| 2,257,170 | Howell | Sept. 30, 1941 |
| 2,261,764 | Horvitz | Nov. 4, 1941 |